United States Patent [19]

Mück et al.

[11] 3,979,532
[45] Sept. 7, 1976

[54] PROCESS FOR THE MANUFACTURE OF ARTIFICIAL LEATHER AND PRODUCT MADE THEREBY

[75] Inventors: Eduard Muck, Otrokovice; Josef Horak, Gottwaldov, both of Czechoslovakia; Jaroslav Strachota, deceased, late of Veseli nad Moravou, Czechoslovakia, by Vera Strachotova, legal representative; Jiri Boleslav, Gottwaldov, Czechoslovakia; Lubomir Grygera, Gottwaldov, Czechoslovakia; Ladislav Bogdanovicz, Hradiste, Czechoslovakia; Otto Hvezda, Otrokovice, Czechoslovakia

[73] Assignee: Statni vyzkumny ustav kozedelny, Czechoslovakia

[22] Filed: Aug. 30, 1973

[21] Appl. No.: 393,199

Related U.S. Application Data

[63] Continuation-in-part of Ser. No. 238,603, March 27, 1972, abandoned.

[30] Foreign Application Priority Data

Apr. 30, 1971 Czechoslovakia .................. 3150-71

[52] U.S. Cl. ............................... 427/245; 427/276; 427/358; 427/371; 427/380; 427/381; 427/390; 427/392; 428/91; 428/151; 428/272; 428/290; 428/904; 8/4; 8/18 R; 8/18 A; 8/21 R; 8/21 D; 8/42 R; 8/43; 8/74; 8/165; 8/180
[51] Int. Cl.² ...................... B05D 5/00; D06C 11/00
[58] Field of Search .......... 117/11, 140 A, 161 UD, 117/138.8 E, 138.8 F, 62.2; 260/894; 8/18 R, 18 A, 74, 165; 427/264, 276, 368, 245, 371, 358; 428/91, 96, 151, 290, 272, 904

[56] References Cited
UNITED STATES PATENTS

| | | | |
|---|---|---|---|
| 1,463,542 | 7/1923 | Angell | 117/64 R |
| 1,949,384 | 2/1934 | Weyner | 117/64 R |
| 2,273,040 | 2/1942 | Iler | 8/94.26 UX |
| 2,452,536 | 11/1948 | Kirk | 117/142 X |
| 2,697,048 | 12/1954 | Secrist | 117/140 A |
| 2,719,795 | 10/1955 | Nottebohm | 117/11 |
| 2,774,687 | 12/1956 | Nottebohm et al. | 117/140 |
| 2,795,524 | 6/1957 | Rodman | 117/140 A |
| 2,817,574 | 12/1957 | Boeddinghaus | 8/18 |
| 2,840,442 | 6/1958 | Abrams et al. | 117/161 UD |
| 2,973,284 | 2/1961 | Semegen | 117/140 A |
| 3,034,927 | 5/1962 | Fairclough et al. | 117/161 UD |
| 3,061,883 | 11/1962 | Frank | 117/11 X |
| 3,101,520 | 8/1963 | George et al. | 117/11 |
| 3,138,431 | 6/1964 | Swiggett | 8/5 |
| 3,193,446 | 7/1965 | Eisenberg | 260/894 |
| 3,266,931 | 8/1966 | Zimmerman et al. | 117/38 X |
| 3,284,392 | 11/1966 | Steinfink | 117/142 X |
| 3,316,202 | 4/1967 | Abere | 117/142 |
| 3,476,580 | 11/1969 | Jinnette | 117/38 X |
| 3,537,871 | 11/1970 | Kaneko | 117/142 X |
| 3,578,481 | 5/1971 | Young | 117/140 A |
| 3,702,785 | 11/1972 | Knechtges et al. | 117/138.8 E |
| 3,731,411 | 5/1973 | Barber et al. | 117/11 |
| 3,732,190 | 5/1973 | Balce et al. | 117/142 X |
| 3,765,974 | 10/1973 | Petersik et al. | 117/62.2 X |
| 3,776,799 | 12/1973 | Gruber et al. | 117/140 A X |
| 3,784,401 | 1/1974 | Wheelock | 117/140 A |
| 3,822,143 | 7/1974 | Wheelock | 117/161 UD X |

FOREIGN PATENTS OR APPLICATIONS

| | | | |
|---|---|---|---|
| 703,156 | 2/1965 | Canada | 117/140 A |
| 668,788 | 8/1963 | Canada | 117/140 A |
| 894,803 | 4/1962 | United Kingdom | 117/140 A |

OTHER PUBLICATIONS

Fox et al., Journal of Soc. Dyers & Colorists, Dec. 1969, pp. 614–616.
Diserens, "The Chemical Technology of Dyeing & Printing," 1951, Reinhold Publishing Corp., vol. II, pp. 34–60 and 326.
Diserens, "The Chemical Technology of Dyeing & Printing," 1948, Reinhold Publishing Corp., pp. 464–469.

*Primary Examiner*—Ronald H. Smith
*Assistant Examiner*—Evan K. Lawrence

[57] ABSTRACT

A process for the manufacture of artificial leather which has a napped, suede or nubuck surface finish by contacting a natural, synthetic of semi-synthetic backing member with a polymeric system comprising a mixture of a heat-reactive latex and a carboxylated latex and which contains at least one dyestuff. Each of the latices is cross-linked in sequence while the contacted backing member is dried. The migration of non-polymeric components in the system of latices is suppressed during drying. The backing so treated is mechanically altered on the grain side of the backing member to provide an irregular leather-like surface thereto.

13 Claims, 4 Drawing Figures

PROCESS FOR THE MANUFACTURE OF ARTIFICIAL LEATHER AND PRODUCT MADE THEREBY

RELATED APPLICATION

The present application is a continuation in part of copending application Ser. No. 238,603, filed Mar. 27, 1972, now abandoned.

BACKGROUND OF THE INVENTION

The present invention relates to a process for the manufacture of artificial leather and to provision of an artificial leather having a napped suede or nubuck grain finish on natural, synthetic or semi-synthetic backing members and in particular to backing members of this type which are contacted with latex systems to bind and to provide a modified surface.

Synthetic and semi-synthetic leathers are presently known and available, possessing, in most cases, grain sides which have smooth surface characteristics. In some cases, the grain sides of known artificial leathers acquire during their manufacture a rather lightly pronounced or delicate pattern which is imitative of the side box or coating surface in which they are formed. In addition, various kinds of embossing treatments are known and employed to provide the grain sides of artificial leathers with surfaces closely resembling the appearance of natural leathers. Among such processes, for example, is the process for manufacturing patent leather. On the other hand, grain-side treatments of natural leathers include various surface treatments, generally of a purely mechanical nature, to provide a napped or nubuck grain-side surface or a suede surface. However, to achieve this type of grain side surface on artificial leathers is difficult. This difficulty is due to a large extent to the fact that in such leathers the grain sides are required to have a very fine and short nap.

Among the processes known for achieving artificial leathers which have a very fine and short nap are those employing a laminate of a foil or sheet made of a polyurethane having a suede-like grain. Also, various electrostatic processes exist in which clumps or flakes of fibers of varying lengths, made of natural or synthetic materials, are deposited on backing members which have been previously coated with an adhesive.

These known processes, however, present numerous disadvantages. For example, where polyurethane foils are employed, the foils must be adhesively bonded to the backing members while at the same time prevented from losing their elastic and rubber-like character. Consequently, the napped, nubuck or suede effect is achieved mainly by visual appearance and not by modification of the material. On the other hand, electrostatic processes involve relatively complicated technological steps, both in preparing suitable clumps or flakes of fibers and in depositing them on the backing members. Moreover, in order to achieve a uniform distribution of the clumps or flakes on the backing members, it is often necessary to repeat the deposition steps repeatedly.

The present invention provides a process which overcomes these disadvantages, and provides an improved suede-like artificial leather composition.

Other objects and advantages of the present invention will appear from the disclosure of the invention as given herein.

SUMMARY OF THE INVENTION

In accordance with the present invention, there is provided a process for the manufacture of artifical leather by which there is imparted a napped or nubuck grain finish thereto comprising the steps of contacting a base or backing member with a polymeric system which comprises a mixture of a heat reactive latex and a carboxylated latex containing at least one dyestuff. The latices are cross-linked sequentially and dried while suppressing the migration of the non-polymeric components of the system. Thereafter, the surface of the backing member is worked to mechanically alter the grain side to provide the irregular leather-like surface desired.

The base or backing member is a woven or non-woven mat, chosen from natural material, synthetic, semi-synthetic materials or their mixtures, to which the polymeric system may be bonded or adhered. A mixture of natural and synthetic fibers such as collagen and polypropylene material may be used for strength and bonding characteristics. Polyester materials may be substituted in whole or in part for the polypropylene.

Preferably the drying is accomplished within a temperature range of about 60° C to about 135° C for a period of time sufficient to dry the material and to promote cross-linking of the material.

Full details of the invention follow herein and are illustrated in the accompanying drawings.

DESCRIPTION OF PREFERRED EMBODIMENTS

Figure 1:
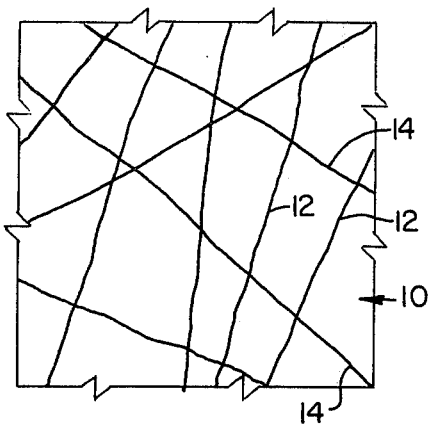
FIG. 1 is a plan view, greatly exploded, of a backing member before treatment.

In carrying out the present process a wide variety of dyestuffs can be used. Generally, conventional metal-complex dyestuffs and acid dyes are employed. The metal-complex dyes are fixed in the backing member after application by subsequently immersing the cross-linked backing member in an aqueous solution of hexamethylenetetramine. On the other hand, when using an acid type dye, the dye is generally fixed by first treating the acid dyed backing with formic acid and then with a cation-active resin and then contacting the dyed backing member with the chromium-complex salt of stearic acid and hexamethylenetetramine.

The dyestuffs which can be employed in the present process fall in the following categories:

Special Direct Dyestuffs

Direct Black RW extra; comprising sodium salt of benzene-azo-3,6-disulpho-8-amino-1-naphtol-7-azo-diphenyl-azo-m-toluylene-diamine, $C_{35}H_{27}N_9O_7S_2Na_2$ having the formula

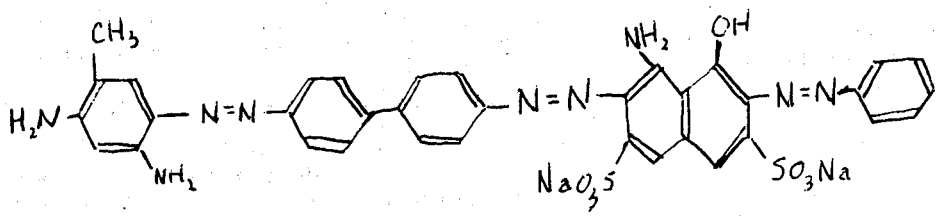

Direct Blue 2B; having the formula

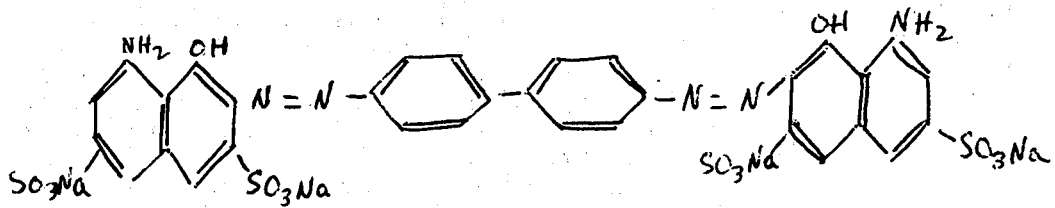

Acid Dyestuffs

Alizarine Chrome Brown RH extra such as $C_{12}H_{11}N_5O_6S$; having the formula

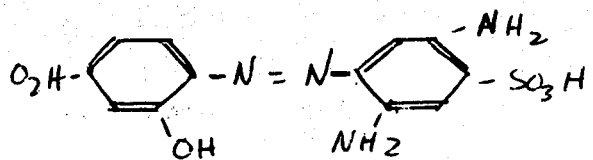

Orange II, a sodium salt of p-sulphobenzene-azo-betanaphtol, $C_{16}H_{11}N_2O_4SNa.5H_2O$; having the formula

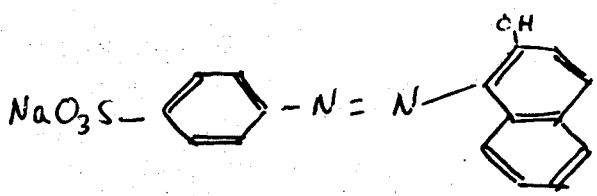

Red PRS "midlonova", $C_{37}H_{32}N_4O_{10}S_3$:

Metal-Complex Dyestuffs

The combination of chromolane and ostalane dyestuffs of the 1:1 metal complex or the 2:1 metal complex such as;

1:1 metal-complex a20-compounds: chromolane YELLOW GR, chromolane BLACK WA EXTRA, chromolane GREEN BL conc., and 2:1 metal-complex a20-compounds: ostalane GREEN GLN, ostalane BLUE BL, ostalane YELLOW GRL.

The base or backing member can be made from a wide variety of materials such as natural, synthetic and semi-synthetic fibers or yarns. For example, the backing member may be made from wool, a combination of wool and synthetic fibers, such as polypropylene or polyester fibers, and from synthetic fibers, such as those mentioned alone or with collagen.

The backing member is preferably formed as a porous web or a non-woven textile material in which the fibers are interwoven or mixed in yarn or mat form. Non-woven mats may be formed by conventional steps and may be carded and needled as desired. A suitable non-woven mat is formed from collagen fibers, mixed with shrinkable polypropylene fibres in a ratio of 60:40 percent by weight. The polypropylene fibers have a fineness equal to 3.5 denier. The mixture made of the fibers is passed through carding and needle-punching machines in order to obtain the finished non-woven textile material. The web is heat-processed (i.e., shrinking) prior to the impregnation step. The surface weight is preferably about 500 g/m².

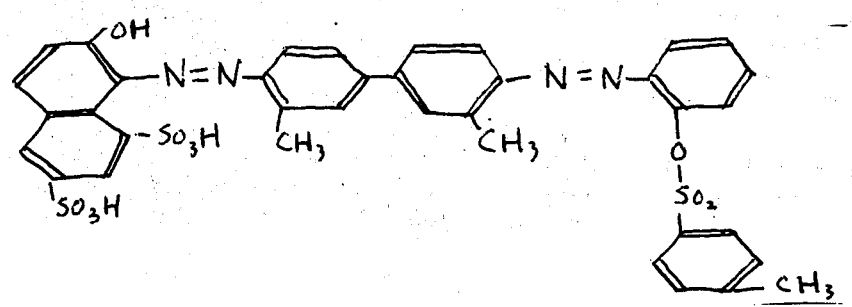

Generally, however, mixtures of collagen fibers and polypropylene fibers may be used in ratios ranging anywhere from 20:80 to 80:20 percent by weight, and with surface weights ranging between 400 to 700 g/m$^2$, and a fiber fineness from 1.2 to 4.0 denier.

A suitable web can be prepared from a mixture of polyester fibres, out of which 30 percent by weight were shrinkable fibers and 70 percent by weight were unshrinkable fibers. In this case, the web was made by the non-woven system for production of textile materials with a fiber fineness equal to 1.5 denier, staple fiber length about 40 mm. and a surface weight of about 450 g/m$^2$.

Generally, webs may be made exclusively of polyester fibers within the following values: fiber fineness 1 to 3 denier, staple fiber length 25 to 60 mm, and surface weight 400 to 500 g/m$^2$.

Further, webs may be used made of a mixture of polyester and polypropylene fibers in a ratio of 70:30, such as a non-woven, needle-punched fabric of felt-like character. The values of the polyester fibres are 1.5 denier, staple 38 mm; and the polypropylene fibers are 1.2 denier, 38 mm staple. The thickness of such a web may be between 2.5 to 3.1 mm and the surface weight 400 to 460 g/m$^2$. Also in this case, the web has been exposed to the heat-shrinking step before impregnation.

Formulation of the binding and simultaneous dyeing system is accomplished in such a manner so as to prevent migration of the dye-stuff during drying and cross-linking and thereby a fast and uniform dyeing is achieved. This is generally brought about by utilizing thermo-reactive and carboxylated latices in the binding system. On the other hand, the utilization of metal-complex dyestuffs permits "after dyeing" prior to fixation. This may be done in dyeing machines at temperatures from about 80°C. to about 90°C. where acid type dyes are employed, without bleeding of such dyes in the moist condition after fixation has taken place.

A wide variety of latices can be used in the polymeric system for carrying out the present process so long as the system contains both heat reactive latices, (generally employed for denoting a category of aqueous dispersions of synthetic elastomers which are characterized by the fact that they form gel-like structures under a spontaneous reaction, caused by the effects of elevated temperatures), and carboxylated latices in combination. Examples of suitable latices are butadiene-acrylonitrile heat-reactive latices, carboxylated butadiene-acrylonitrile latices and heat-reactive polyacrylate latices. In addition, the binding agent or material generally contains other polymeric constituents such as polypropylene oil, maleic anhydride-styrene copolymer and urea-formaldehyde resin in addition to the dyestuff added thereto. The polypropylene oil is used an an inner lubricating agent of the elastomeric mixture and it may at the same time also influence the inner structure and cellularity of the impregnating deposit in the sheet.

The maleic anhydride-styrene copolymer is characterized with high adherence to albuminous fibers, as well as to synthetic fibers of the nylon and polyester type; in the form of ammonium salt it may also represent one of the types of thermo-unstable substances, which may influence, or rather uphold, the thermosensibility of the impregnating system.

The urea-formaldehyde resin is a conventional admixture for cross-linking some of the types of butadiene-based copolymers — here it aids in the cross-linking of the carboxylated and heat-reactive latex mixture.

Among the heat-reactive, self-crosslinking latices which may be employed are those of the butadiene-acrylonitrile type, of which the following are illustrative and may be used:

a. Hycar 1570 H 6 — a product of AKU-Goodrich Ciago Co., Arnhem, The Netherlands, b. Hycar 1570 H 36 — a product of AKU-Goodrich Ciago Co., Arnhem, The Netherlands, c. Acralen BN — a product of Farbenfabriken Bayer Aktiengesellschaft, Leverkusen, West Germany, d. Revinex 1650 — a product of Revertex Ltd., Harlow, Great Britain, e. Revinex ET 222 — a product of Revertex Ltd., Harlow, Great Britain.

The ratio of butadiene to acrylonitrile vary in the above, and, insofar as the present invention is concerned, is not critical.

Among the heat-reactive, self-crosslinking latices of the acrylate type, the products sold under the following tradenames may be used:

f. Revertex A 275 — a product of Revertex Ltd., Harlow, Great Britain, g. Revertex A 272 — a product of Revertex Ltd., Harlow, Great Britain.

The carboxylic-modified latices of the butadiene-acrylonitrile type, suitable for the method according to the present patent application, may include the products available under the following tradenames:

a. Revertex 5040 — a product of Revertex Ltd., Harlow, Great Britain, b. Revertex 850 — a product of Revertex Ltd., Harlow, Great Britain, c. Revinex 93 Z 40 — a product of Revertex Ltd., Harlow, Great Britain, d. Perbunan M — a product of Farbenfabriken Bayer Aktiengesellschaft, Leverkuson, West Germany.

In carrying out the process of this invention, the backing member is generally saturated with a binding agent at ambient temperatures by any conventional method such as with a Foulard apparatus so as to achieve a total binding agent by weight, on a dry basis in the finished product, of about 50 percent. Subsequently, the backing member is then dried and cross-linked at a temperature in a range of about 60°C. to about 135°C. in an extending drier. When drying and cross-linking are completed, the backing member is then contacted by immersion at ambient temperatures or in any other suitable manner with an aqueous solution, preferably 10 percent, of a chromium-complex salt of stearic acid in a specially designed multi-functional, Foulard-type machine, so as to deposit 10 percent by weight, based on the weight of the backing member and binding agent, of the salt. Then, the so treated backing member is contacted again at ambient temperature with a 1.0 percent hexamethylenetetramine solution so as to leave about 1.0 percent of this fixation agent in the backing member. Once again the backing member is dried in an extending drier.

The constituents in the binding agent are generally employed in an aqueous solution of a concentration to make handling convenient. Moreover, the amounts of each particular constituent in the binding agent are not critical and can be varied within a wide range generally calculated on a weight basis. Particularly useful illustrative formulations are set forth in the examples below.

The hydrophobic effect of the chromium complex salt of stearic acid is of only a secondary importance. The basic purpose of the complex salt is the fixation of the dyestuff used inside the impregnated sheet material and preventing the so called "bleeding" of the dyestuff therefrom. It is because of this reason that the impregnated sheet material is immersed after crosslinking into the baths, first into the solution of the chromium complex salt of stearic acid and thereafter into the hexamethylenetetramine solution. When the sheet material treated in this way is dried, the hexamethylenetetramine under heat decomposes into ammonium and formaldehyde; the formaldehyde formed disturbs the state of equilibrium of the chromium complex salt of stearic acid by liberating chromium therefrom and the thus liberated chromium becomes able to enter into combination with molecules of the metal-complex dyestuff, which results in fixation of the dyestuff inside the impregnated sheet material.

The operations of subsequent immersing of the impregnated sheet material into the solution of the chromium complex salt of stearic acid and thereafter into the hexamethylenetetramine solution, are not only typical, but also critical, as mixing of these two components in one bath for instance would lead to instantaneous interference with the complex state of equilibrium with a resultant loss of ability to combine with the impregnated sheet material.

The steps set forth above having been accomplished, the backing member is then subjected to mechanical working and alteration of the grain side surface by a buffing machine or a textile combing machine. When buffing is utilized, it is accomplished in a two-step operation in a through-put buffing machine, the second buffing step being carried out in a direction exactly opposite to the first, that is, at an angle of 180°. Moreover, buffing is usually achieved with a buffing paper of low granularity which produces a napped or nubuck surface characteristic. In contrast, when raising of the grain side is carried out on a through-put textile combing machine, a suede-like surface characteristic is attained.

From the foregoing, it will be observed that the polymeric system includes at least latices of two types, in combination, namely, the heat-reactive latice and the carboxylated latice. As a result, the cross-linking occurs independently and selectively with each latex so that a unique and unobvious result is obtained. This result, as hereinafter described, cannot be, and is not, obtained by heat treating a carboxylated latex or by attempting to carboxylate a heat reactive latex alone. The selective and independent cross-linking occurs in time stages or sequentially so that one latex sets up before the other. This enables the working step to so modify the material that the suede, nubuck or finished surface more closely simulates real leather. This result is clearly shown in the drawings.

Turning to the drawings, FIG. 1 illustrates in enlarged form a portion of an untreated non-woven mat or sheet forming the backing member 10 comprising crossing strands of natural fibers 12 such as collagen or wool and synthetic fibers 14 such as polypropylene or polyester 14. This mat is impregnated by immersion, coated with a roll coater, or by some other means contacted with the polymeric system in which at least the heat-reactive and the carboxylated latices are combined. After contacting the sheet, the latices enter into the pores or spaces between the fibers and gravitate to and about their intersections. Because the carboxylated latex cross-links at a more rapid pace, the carboxylic-modified latex quickly cross-links and becomes deposited (See FIG. 2) at the points of intersection of the fibers, as indicated by the numeral 16, thereby forming nodes or centers binding the fibers together, and about which the heat reactive latices (still uncrosslinked) 18 may themselves later bind.

Figure 3:
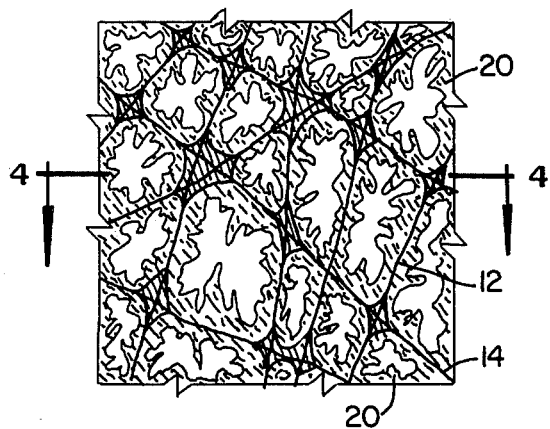
FIG. 3 is a similar view after cross-linking of the second component.

The nodes or centers 16 of the cross-linked carboxylated latex form "crystal nuclei" upon which the heat-reactive latex may bind itself. As seen in FIG. 3, the heat-reactive latex 18 has cross-linked to form villi 20 which extend and protrude from the centers 16 and the fibers into the spaces between the fibers 12 and 14. The term villi as used herein means minute finger-like webs of the cross-linked, heat-reactive latex having a fiber-like structure and more or less thickly covering and giving a smooth, velvety appearance to the surface. It will be observed, however, that the villi do not totally fill the space and thus do not destroy the breathability of the backing member.

Figure 2:
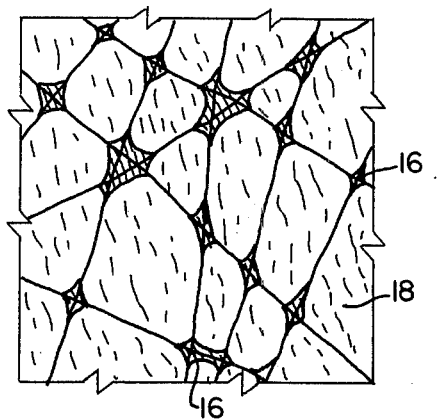
FIG. 2 is a similar view after application of the polymeric system and cross-linking of one component.

After the polymeric system has been dried and complete cross-linking effected, the surface of the sheet is worked, by buffing, etc. The first buffing step acts to loosen the fibers of the sheet to free certain fibers or fibrils 22. The second buffing step, effected in the diametrically opposite direction, more perfectly loosens the fibers and acts to separate them into individual fibers. That is, the working steps eventually break the existing fiber agglomerates into distinct fibers 22 extending from the surface similar to a nap. At the same time, smaller villi 24 are formed from the dry matter of the latex villi, which are loosened by the buffing step from the interstitial spaces of the web fibers. A sort of analogy is achieved to a certain extent with furs, where besides the long fibers, still shorter underhair is involved, being a sort of supporting layer of the longer fibers or hair. Thus, the feeling or touch of the material surface becomes more suede-like in appearance and in properties, exhibiting the so-called "writing effect." The final condition of the material surface, after both of the buffing steps have been performed, is diagramatically enlarged and illustrated in FIG. 4, where the longer fibers, protruding from the web, are in their bottom part wrapped with underhair of the cross-linked heat-reactive latices, loosened by the second buffing step from the interstitial spaces of the web fibers. It is to be stressed, that for the purposes of simplification, the FIGS. 1 to 3 are illustrated as a plane, but the orientation inside the sheet material is as a matter of fact, three dimensional.

Artificial leather made in accordance with this process may be utilized for fancy or ready-made items such as clothing, as well as for goods where no requirements for high strength and lower extensibility are needed. The present process produces a product which suits these purposes well. On the other hand, when requirements call for higher strength and lower extensibility, a reinforcing fabric may be adhesively bonded to the flesh side of the backing member. Generally, however, the artificial leathers made in accordance with the present process do not differ practically from napped nubuck or suede made from natural leathers and can be used as substitutes therefor in all respects.

The present process presents numerous advantages. For example, the process can be carried out in a relatively simple manner on readily available equipment and employs readily available materials which can be obtained at reasonable costs. Another particular advantage of the process of this invention is that it may be carried out directly on the backing members. Furthermore, napped nuback or suede made by the instant process are hardly distinguishable in appearance and properties from natural products of the same type. In comparison, like materials made by electrostatic methods possess a plush, typical textile character.

In order to illustrate the present invention more fully, the following examples are set forth. It is to be understood that the examples are illustrative and not limitative. In the examples all parts and percents are by weight unless otherwise indicated.

EXAMPLE 1

A backing member prepared from collagen and polypropylene fibers was prepared using a non-woven system of manufacturing textile materials, in which the collagen fibers were mixed with shrinkable polypropylene fibers in a ratio of 60:40 percent by weight. The polypropylene fiber's fineness equalled 3.5 denier. The mixture made of the fibers was passed through carding and needle-punching machines in order to obtain the non-woven textile material, whereupon heat-processing (shrinking) of the web followed. The resultant web was in a condition to undergo the impregnation step and had a surface weight = 500 g/m². The web was saturated at ambient temperature (ca. 20°C.) with an aqueous solution of a binding agent mixture containing by weight, on a dry basis, 60 parts of a butadiene-acrylonitrile, heat-reactive type latex, 35 parts of a carboxylated butadiene-acrylonitrile type latex, 5 parts of a heat-reactive polyacrylate type latex, 10 parts of an aqueous dispersion of polypropylene oil having a molecular weight of 800, 6 parts of an ammonium solution of maleic acid anhydride-styrene copolymer, 5 parts of a precondensate of urea and formaldehyde and an aqueous solution of a metal-complex dyestuff. in a quantity equal to 3.0 percent of the binding system, the total system having a solids content of about 28.0 percent.

The saturation was carried out on a Foulard type machine to achieve a total binding system, on a dry basis, in the backing of 50 percent by weight. Next, the saturated backing member was dried at a temperature of 135°C. in an extending drier during which cross-linking took place as illustrated in FIG. 3. The dried backing member was then immersed in a 10 percent aqueous solution of a chromium-complex salt of stearic acid in a specially designed difunctional Foulard type machine to deposit a 10 percent, dry basis content, based on the weight of the so treated backing member, of this agent in the backing member after which the backing member was then saturated with a 1.0 percent aqueous solution of hexamethylenetetramine fixation agent to leave 1.0 percent of this agent in the backing member. Again the backing member was dried at 135°C. in an extending drier to bring about final fixation of the dye, as well as water repellancy in the material.

Figure 4:
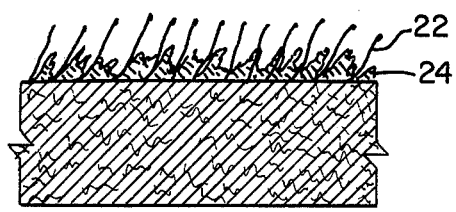
FIG. 4 is a sectional view, of the finished product showing the results of buffing the surface shown in FIG. 3.

The so treated backing member was then buffed in a two-step operation in a through-put buffing machine provided with a paper of low granularity as a buffing surface. The second buffing step was carried out in a direction opposite to the first. A napped, nubuck surface (as illustrated in FIG. 4) on the grain side of the backing member resulted upon completion of buffing. The artificial leather so made was practically indistinguishable from natural napped, nubuck leather and was suitable for use in making shoes, as well as for making fancy leather goods.

EXAMPLE 2

The procedure of EXAMPLE 1 was repeated except that a polyester fiber backing member was employed. The web has been prepared from a mixture of polyester fibers, out of which 30 percent by weight were shrinkable fibers and 70 percent by weight were unshrinkable fibers. The web was made by the nonwoven system for production of textile materials and had a fiber fineness of 1.5 denier, staple fiber length being 40 mm, and the surface weight = 450 g/m². The product obtained had a napped, nubuck grain side and was suitable for the manufacture of shoes and fancy leather goods.

EXAMPLE 3

The procedure of both EXAMPLES 1 and 2 was repeated except that in the final operation raising of the grain side was carried out on a through-put textile combing machine and a suede-like surface was achieved. The artificial leather so formed was suitable for use in the shoe making industry and in the fancy leather goods industry.

EXAMPLE 4

The procedure in EXAMPLES 1, 2 and 3 were repeated except that dyeing was achieved with a mixture of metal-complex dyestuffs. Moreover, the temperature in the extending drier was maintained at 60°C. in the first sections and gradually increased to 135°C. in the following sections, thereby final drying and cross-linking took place in the final sections of the drier. The products so obtained were like those obtained in the previous EXAMPLES.

EXAMPLE 5

The procedures of EXAMPLES 1, 3 and 4 were repeated except that it was accomplished in a Jigger type dyeing apparatus with acid dyes being employed in 1.5 percent solution in the desired shades. Moreover, the first dyeing step was carried out at a temperature of from 80°C. to 90°C. for 30 minutes after which 50 parts by weight, based on the weight of the dyestuff, of formic acid was added to the dye bath and dyeing was continued for an additional 15 minutes. The dye bath was then drained and final fixation of the dye was accomplished by contacting the backing members with an aqueous cation-active resin solution which was placed in contact with the dyed backing members in an amount sufficient to provide 0.2 percent by weight, based on the weight of the backing members so treated, of the resin.

The final fixation step was then followed by saturating the backing members with a 10 percent aqueous solution of a chromium-complex salt of stearic acid followed by saturation with a 1.0 percent aqueous solution of hexamethylenetetramine. Finally, the backings were washed in water for a period of 30 minutes to remove the non-fixed portions of the dyes. Excess water was then removed by pressing and the products were then dried in an extending drier at 125°C., during which cross-linking took place.

The products so obtained were similar to those made in accordance with EXAMPLES 1, 3 and 4 and were suitable for the same types of use.

Numerous other advantages and embodiments of the process disclosed herein will be apparent to those skilled in the art. It is to be understood, therefore, that many embodiments of this invention may be made without departing from the spirit and scope thereof. Accordingly, this invention is not to be limited to the disclosed embodiments thereof except as defined in the appended claims.

What is claimed is:

1. A process for the manufacture of artificial leather and for imparting a napped, or nubuck grain finish thereto comprising the steps of providing a backing member comprising a matrix of crossing strands of fibers, contacting at least one side of said backing member with a polymeric system comprising a mixture of a heat-reactive latex and a carboxylated latex, the latter being self-cross-linkable at a more rapid rate than the former under application of heat, at a temperature in a range of about 60°C. to about 135°C., subjecting said contacted backing member to a temperature within said range for a period of time to effect sequential cross-linking of said carboxylated latex about the points of crossing of said strands and of said heat-reactive latex about said cross-linked carboxylated latex and drying of the contacted backing member, and thereafter buffing said one side in two steps, the direction of the second buffing step being shifted an angle of 180° from the first buffing step thereby mechanically altering said one side of the dried backing member to provide an irregular leather-like surface thereto consisting of elongated fibers from said backing member and shorter villi of said cross-linked, heat-reactive latex.

2. A process as defined in claim 1 wherein the mechanical altering comprises processing the grain side of the dried backing member on a textile combing machine to thereby impart a suede-like finish thereto.

3. The process according to claim 1 wherein the latex mixture includes at least one dyestuff and further including the step of fixing said dyestuff after cross-linking of each said latex and drying of the said backing member and prior to buffing said backing member.

4. The process according to claim 3 wherein a metal-complex dyestuff is employed in said polymeric system and the dyestuff is fixed by contacting the dried and cross-linked backing member with a 10% aqueous solution of a chromium complex salt of stearic acid so as to deposit 10% by weight of the salt based on the weight of the contacted backing member and then with a 1.0% aqueous solution of hexamethylenetetramine so as to leave on the order of 1 percent of the chromium complex salt in the backing member.

5. The process according to claim 4 wherein the backing member is again dried after contact with the hexamethylenetetramine solution.

6. The process according to claim 1 wherein said dyestuff is acid and the dyestuff is fixed in the system inside the backing member prior to said cross-linking by contacting the dyed backing member with a solution of a cation-active resin and subsequently with a chromium-complex salt of stearic acid and then with a hexamethylenetetramine solution.

7. The process according to claim 6 wherein formic acid is added to the latex mixture including an acid dyestuff before the dyed backing member is contacted with the cation-active resin solution.

8. The process according to claim 1 wherein the backing member comprises collagen and polypropylene fibers.

9. The process according to claim 1 wherein the backing member comprises a natural material.

10. The process according to claim 1 wherein the backing member comprises a synthetic material selected from the group consisting of polypropylene and polyester materials.

11. A process according to claim 1 wherein the heat reactive latex is selected from the group consisting of a butadiene-acrylonitrile copolymer and a polyacrylate and the carboxylated latex comprises a butadiene-acrylonitrile copolymer.

12. A process according to claim 1 wherein said polymeric system includes one or more of the additional ingredients consisting of polypropylene oil having a molecular weight of about 800, maleic anhydride styrene copolymer or urea formaldehyde condensate polymer.

13. An artificial leather comprising a fabric base having crossing strands of fibers, wherein a carboxylated latex is cross-linked at the intersection of said crossing strands to bind the fabric together, and a heat-reactive latex is cross-linked about said cross-linked, carboxylated latex, and having elongated fibers from said base and shorter villi of said cross-linked, heat-reactive latex extending from the plane of said fabric to provide an irregular leather-like surface having a napped finish.

* * * * *